US011091155B2

(12) United States Patent
Suzuki et al.

(10) Patent No.: US 11,091,155 B2
(45) Date of Patent: Aug. 17, 2021

(54) PARKING CONTROL METHOD AND PARKING CONTROL DEVICE

(71) Applicant: Nissan Motor Co., Ltd., Yokohama (JP)

(72) Inventors: Yasuhiro Suzuki, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/636,815

(22) PCT Filed: Aug. 10, 2017

(86) PCT No.: PCT/JP2017/029211
§ 371 (c)(1),
(2) Date: Feb. 5, 2020

(87) PCT Pub. No.: WO2019/030923
PCT Pub. Date: Feb. 14, 2019

(65) Prior Publication Data
US 2020/0369263 A1 Nov. 26, 2020

(51) Int. Cl.
*B60W 30/09* (2012.01)
*B60W 30/06* (2006.01)
*B60W 50/14* (2020.01)
*B62D 15/02* (2006.01)
*G05D 1/00* (2006.01)

(52) U.S. Cl.
CPC ............ *B60W 30/09* (2013.01); *B60W 30/06* (2013.01); *B60W 50/14* (2013.01); *B62D 15/0285* (2013.01); *G05D 1/0011* (2013.01); *B60W 2050/146* (2013.01)

(58) Field of Classification Search
CPC ...... B60W 30/09; B60W 30/06; B60W 50/14; B62D 15/0285; G05D 1/0011
USPC ................................................................. 701/2
See application file for complete search history.

(56) References Cited

U.S. PATENT DOCUMENTS

| 9,738,277 | B2 * | 8/2017 | Ha ....................... B62D 15/02 |
| 2009/0278709 | A1 * | 11/2009 | Endo .................... B62D 15/027 |
| | | | 340/932.2 |
| 2010/0283632 | A1 * | 11/2010 | Kawabata .............. G08G 1/165 |
| | | | 340/932.2 |
| 2015/0203111 | A1 * | 7/2015 | Bonnet ................ B62D 15/027 |
| | | | 701/25 |

(Continued)

FOREIGN PATENT DOCUMENTS

| JP | 2007-265288 A | 10/2007 |
| JP | 2007-295033 A | 11/2007 |

(Continued)

*Primary Examiner* — Peter D Nolan
*Assistant Examiner* — Luke Huynh
(74) *Attorney, Agent, or Firm* — Young Basile Hanlon & MacFarlane, P.C.

(57) ABSTRACT

A parking control method is provided for executing a control instruction to move a vehicle along a parking route. This method includes selecting a second position with relatively high operability of remote operation from among one or more first positions at which an operator of the vehicle can get off the vehicle, stopping the vehicle at the second position, and parking the vehicle in accordance with the control instruction on the basis of an operation command acquired from the operator who has got off the vehicle.

9 Claims, 23 Drawing Sheets

(56) References Cited

U.S. PATENT DOCUMENTS

| | | |
|---|---|---|
| 2017/0032680 A1 | 2/2017 | Imai et al. |
| 2017/0253237 A1* | 9/2017 | Diessner ............... B60W 30/06 |
| 2018/0162384 A1* | 6/2018 | Kim .................. B62D 15/0285 |
| 2018/0246515 A1* | 8/2018 | Iwama ................. G05D 1/0246 |
| 2018/0259956 A1 | 9/2018 | Kawamoto |

FOREIGN PATENT DOCUMENTS

| | | |
|---|---|---|
| JP | 2008-174192 A | 7/2008 |
| JP | 2010-018167 A | 1/2010 |
| JP | 5408344 B2 | 2/2014 |
| JP | 2014-146288 A | 8/2014 |
| JP | 5692292 B2 | 4/2015 |
| JP | 2017-007399 A | 1/2017 |
| JP | 2017-030481 A | 2/2017 |
| KR | 10-2017-0025206 A | 3/2017 |
| WO | 2017/057060 A1 | 4/2017 |
| WO | 2017/068698 A1 | 4/2017 |

* cited by examiner

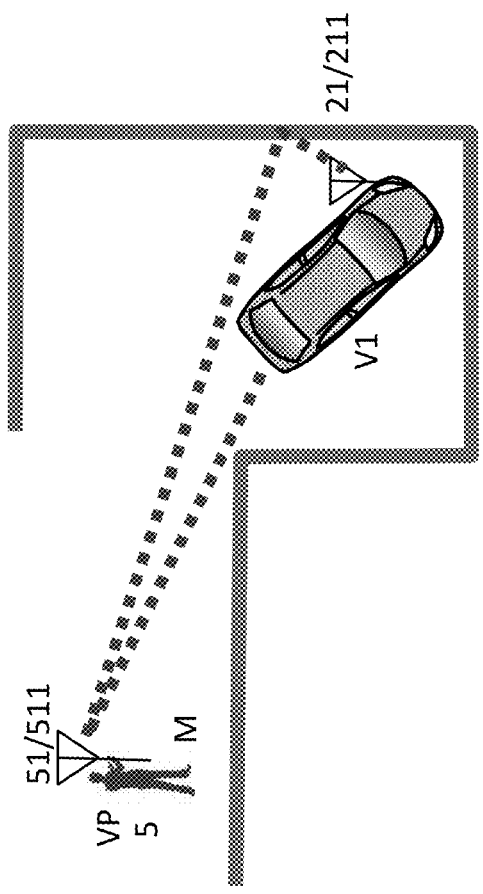

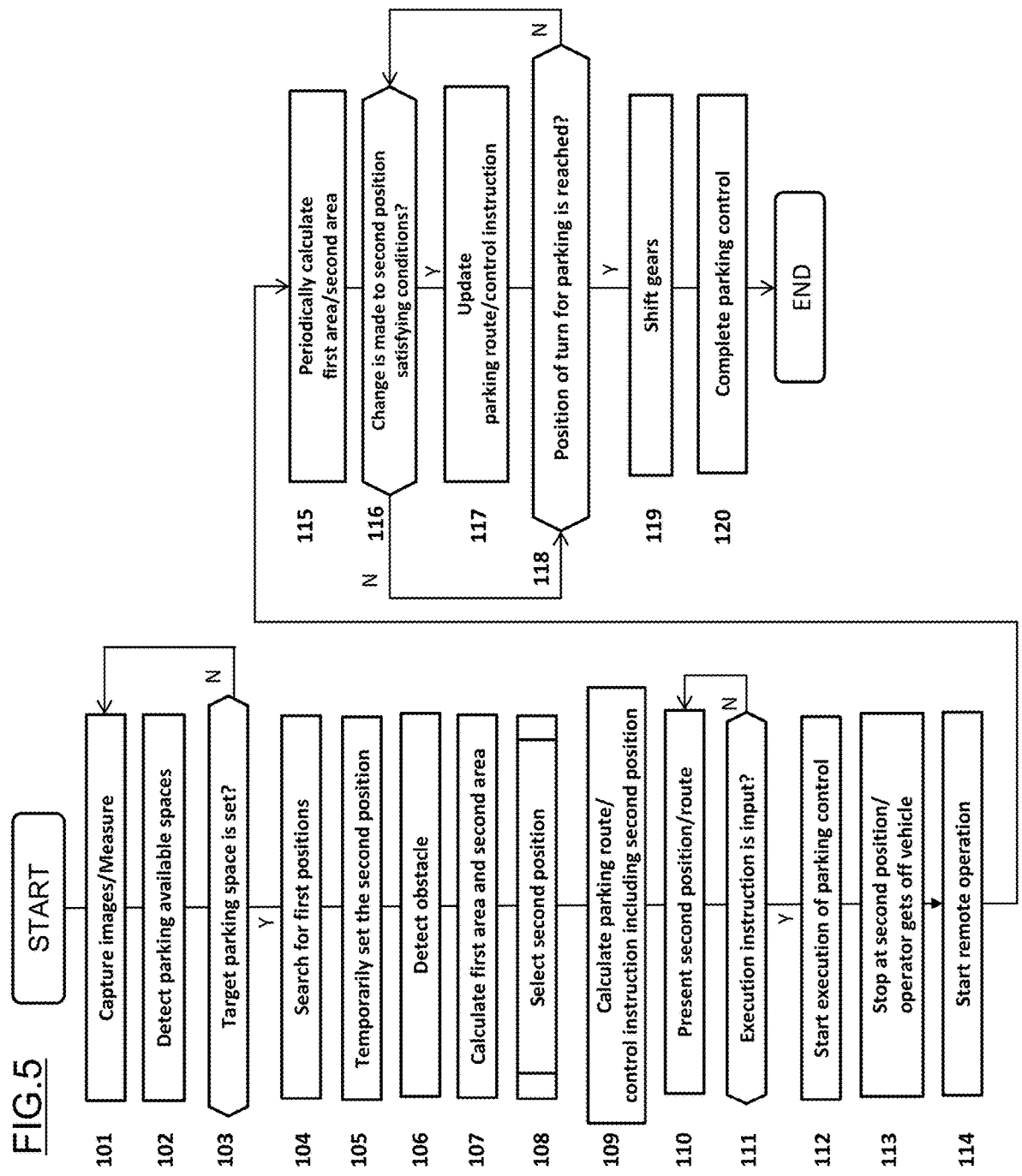

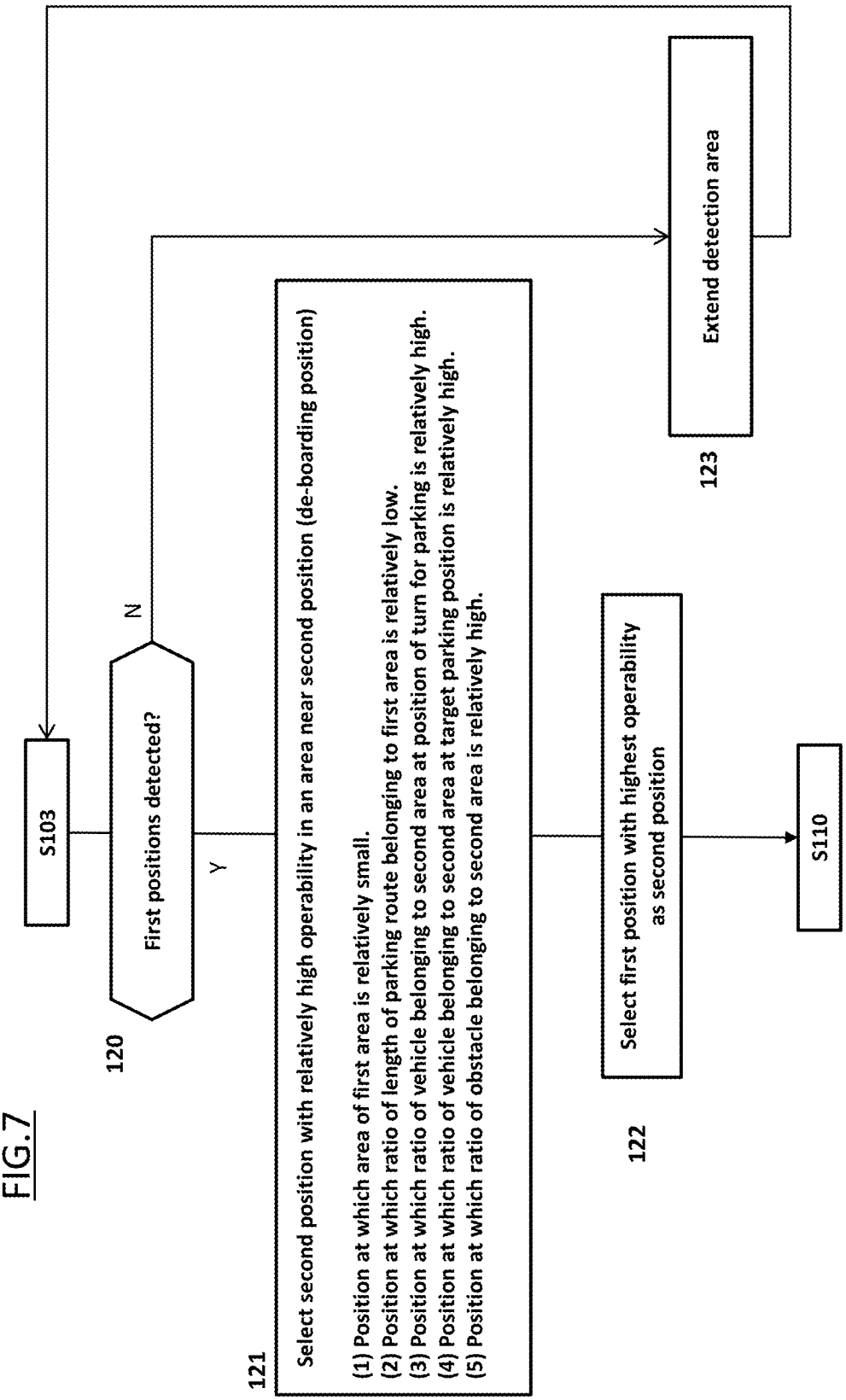

PARKING CONTROL METHOD AND PARKING CONTROL DEVICE

TECHNICAL FIELD

The present invention relates to a parking control method and a parking control apparatus.

BACKGROUND

An autonomous (automated) steering technique for a vehicle is known, in which when the vehicle is parked on the basis of an entrance command received from outside of the vehicle but an occupant of the vehicle cannot get off the vehicle at a parking destination, the vehicle is moved along a travel trajectory to a position that is closest to the parking destination and at which a space is ensured for the occupant to get off the vehicle, and the vehicle is moved to the parking destination after the occupant gets of the vehicle (JP5692292B).

SUMMARY

Even when a space for getting off the vehicle can be ensured, the operability of remote operation may be poor depending on the position of getting off the vehicle.

A problem to be solved by the present invention is to allow an operator to get off a vehicle at a position at which the operability of remote operation of the vehicle is good.

The present invention solves the above problem by stopping a vehicle at a second position with relatively high operability of remote operation among one or more first positions at which an operator of the vehicle can get off the vehicle.

According to the present invention, the operator can perform remote operation of the vehicle without moving after getting off the vehicle.

BRIEF DESCRIPTION OF THE DRAWINGS

FIG. 4C is a diagram for describing a third calculation scheme for a first area (blind area) and a second area;

FIG. 5 is a flowchart illustrating an example of a control procedure executed by the parking control system according to one or more embodiments of the present invention;

FIG. 7 is a flowchart illustrating a subroutine of the process of selecting a deboarding position;

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
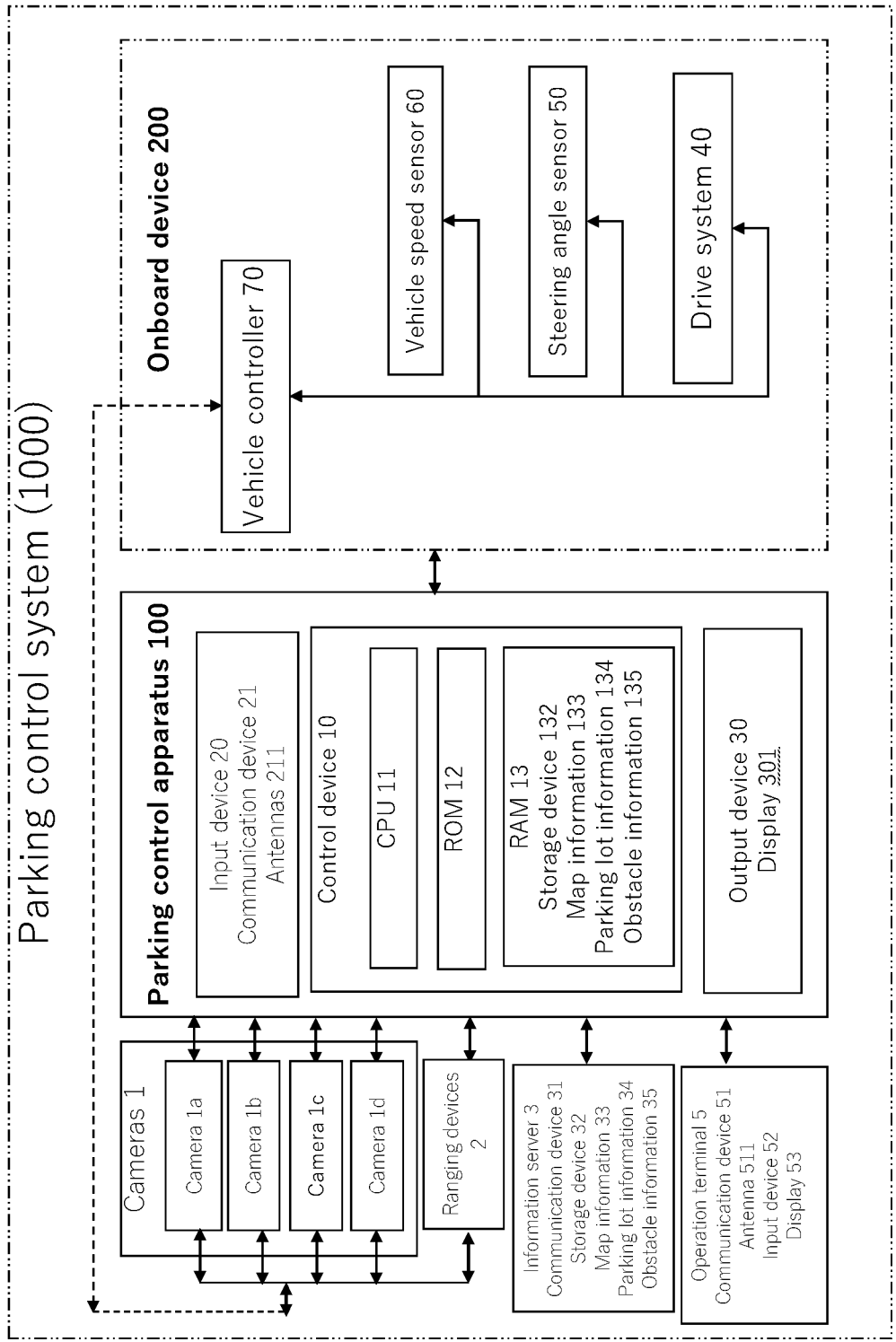
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, and a vehicle speed sensor 60. The parking control apparatus 100 according to one or more embodiments of the present invention operates to control the operation of moving (parking) a vehicle V as the target of control into a parking space on the basis of an operation command that is input from the operation terminal 5.

The operation terminal 5 is a portable computer that can be brought out to outside of the vehicle V and has an input function and a communication function. The operation terminal 5 receives the input of an operation command made by an operator M for controlling the driving (operation) of the vehicle V for parking. The driving includes operations for parking (operations for entering a parking space and exiting the parking space). The operator M inputs instructions via the operation terminal 5. The instructions include an operation command for execution of parking. The operation command includes information on the execution/stop of parking control, selection/change of a target parking position, and selection/change of a parking route and other information necessary for parking. The operator M can also make the parking control apparatus 100 recognize the instructions including the operation command without using the operation terminal 5, such as by a gesture of the operator M (i.e., the operator M can input such instructions to the parking control apparatus 100 without using the operation terminal 5, such as by a gesture).

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server includes a communication device 31 and a storage device 32. The storage device 32 includes readable map information 33, parking lot information 34, and obstacle information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 301. The output device 30 notifies the driver of parking control information. The display 301 according to one or more embodiments of the present invention is a touch panel-type display having an input function and an output function. When the display 301 has an input function, it serves as the input device 20. Even when the vehicle V is controlled on the basis of the operation command which is input from the operation terminal 5, an occupant (driver or passenger) can input an operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for selecting a second position with relatively high operability of remote operation from among one or more first positions at which the operator M of the vehicle V can get off the vehicle V, calculating a parking route and a control instruction on the basis of an operation command acquired from the operator M who has got off the vehicle V at the second position, and executing the parking control for the vehicle V in accordance with the control instruction.

The parking control apparatus 100 according to one or more embodiments of the present invention is a remote control-type apparatus that receives the operation command from external and controls the movement of the vehicle V to park the vehicle V into a given parking space. During this operation, the occupants may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select the target parking position, or the parking control apparatus 100 or the parking facility side may automatically set the target parking position.

The control device 10 of the parking control apparatus 100 according to one or more embodiments of the present invention has functions of executing an extraction process for the first positions, a selection process for the second position, a calculation process for the parking route, a calculation process for the control instruction, and a parking control process. Each of the above processes is executed by cooperation of software for implementing the process and the above-described hardware.

Some processes of detecting the position of the operator M will be described with reference to FIGS. 2A to 2D. The control device 10 acquires the position of the operator M. The position of the operator M is used for calculation of a blind area. The position of the operator M includes information on the position and information on the height on the movement plane of the vehicle V. The position of the operator M may be detected on the basis of the sensor signals from sensors provided in the vehicle V or may also be obtained through detecting the position of the operation terminal 5 carried by the operator M and calculating the position of the operator M on the basis of the position of the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 at that position. In these cases, the position of the operation terminal 5 can be employed as the position of the operator M.

Figure 2A:
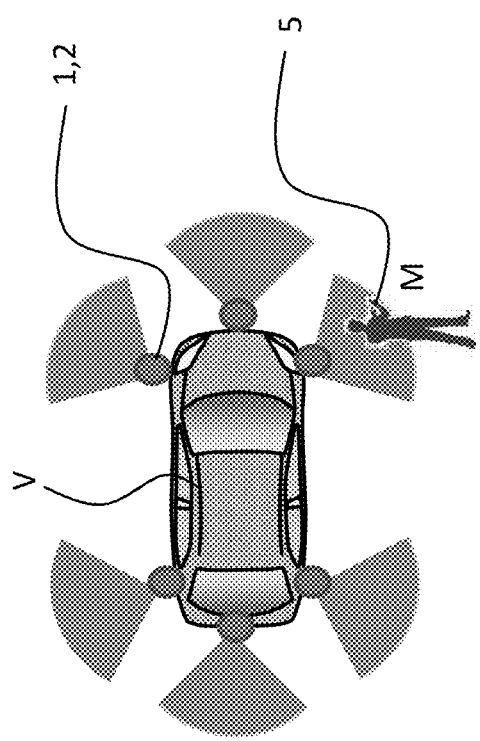
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the two-dimensional position and/or three-dimensional position of the operator M can therefore be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with the gesture.

Figure 2B:
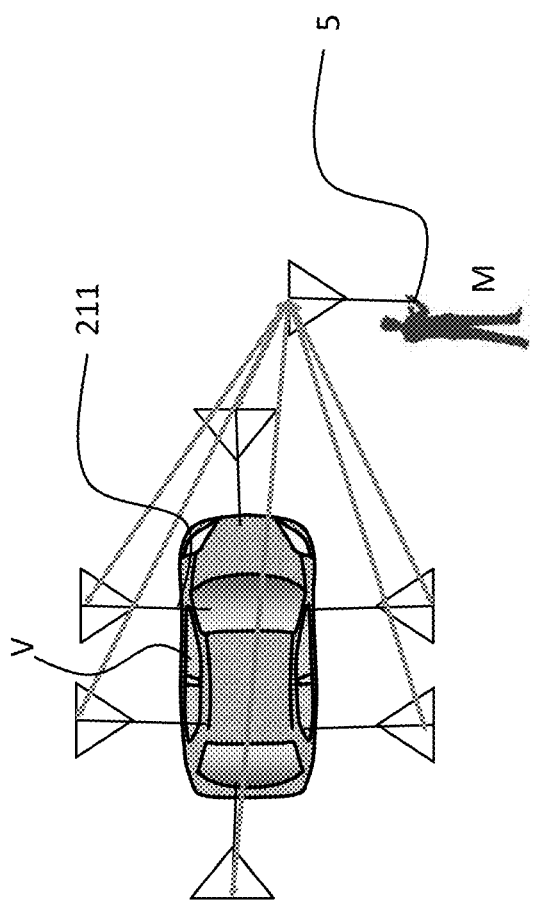
FIG. 2B is a diagram for describing a second detection scheme for the position of an operator.

As illustrated in FIG. 2B, the position of the operation terminal 5 or the position of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from (based on) the intensity difference between the received radio waves of the antennas 211.

Figure 2C:
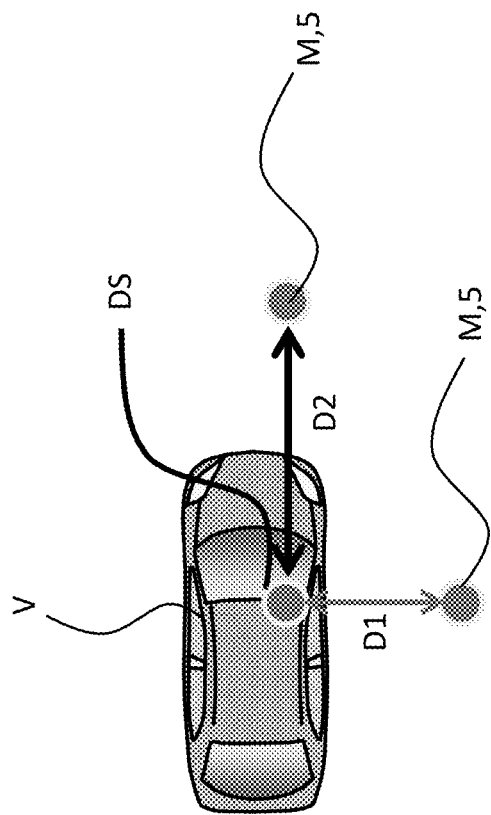
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to calculate the initial position of the operator M with respect to the vehicle V or the initial position of the terminal 5, which is carried by the operator M, with respect to the vehicle V.

Figure 2D:
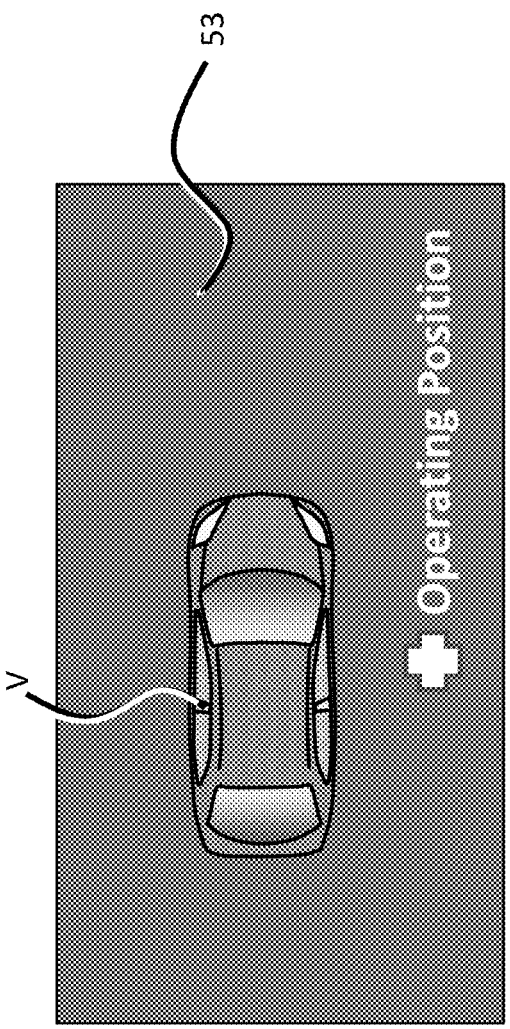
FIG. 2D is a diagram for describing a fourth detection scheme for the position of an operator.

As illustrated in FIG. 2D in a similar manner, image information representing the operating position (a position at which the operator M stands: operation position) with respect to the vehicle V is displayed on the display 53 of the operation terminal 5. This display control may be executed by an application installed on the operation terminal 5 side or may also be executed on the basis of a command from the control device 10.

In one or more embodiments of the present invention, the position of the operator M is calculated to calculate a second area which the operator M can visually recognize or a first area (blind area) which the operator M cannot visually recognize. When calculating the second area (or the first area), the detected two-dimensional position of the operator M may be calculated as the observation position. In this calculation, the eye position of the operator M (height information) may be taken into account. A position corresponding to the eye position of the operator M is calculated as the observation position on the basis of the two-dimensional position of the operation terminal 5 obtained by the above scheme. The observation position may also be calculated using the standing height of the operator M, which is preliminarily set, or the average standing height of adults. When the detection signal representing the positional information of the operation terminal 5 includes height information, the position of the operation terminal 5 may be employed as the observation position.

The detection process for an obstacle will be described with reference to FIGS. 3A and 3B. Obstacles include structures, such as walls and pillars of a parking lot, installations around the vehicle, pedestrians, other vehicles, parked vehicles, etc.

Figure 3A:
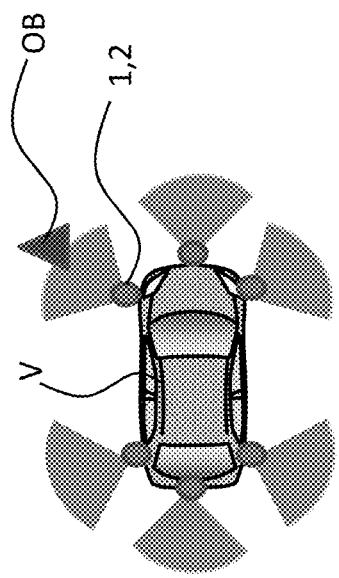
FIG. 3A is a diagram for describing a first detection scheme for an obstacle.

As illustrated in FIG. 3A, an obstacle is detected on the basis of the detection results from the multiple ranging devices 2 provided in the vehicle V and the images captured by the cameras 1. The ranging devices 2 detect the existence or absence of an object, the position of the object, the size of the object, and the distance to the object on the basis of the received signals from the radar devices. Additionally or alternatively, the existence or absence of an object, the position of the object, the size of the object, and the distance to the object may be detected on the basis of the images captured by the cameras 1a to 1d. The detection of an obstacle may be performed using a motion stereo technique with the cameras 1a to 1d. The detection results are used to determine whether or not a parking space is empty (whether or not a vehicle is parked in the parking space).

Figure 3B:
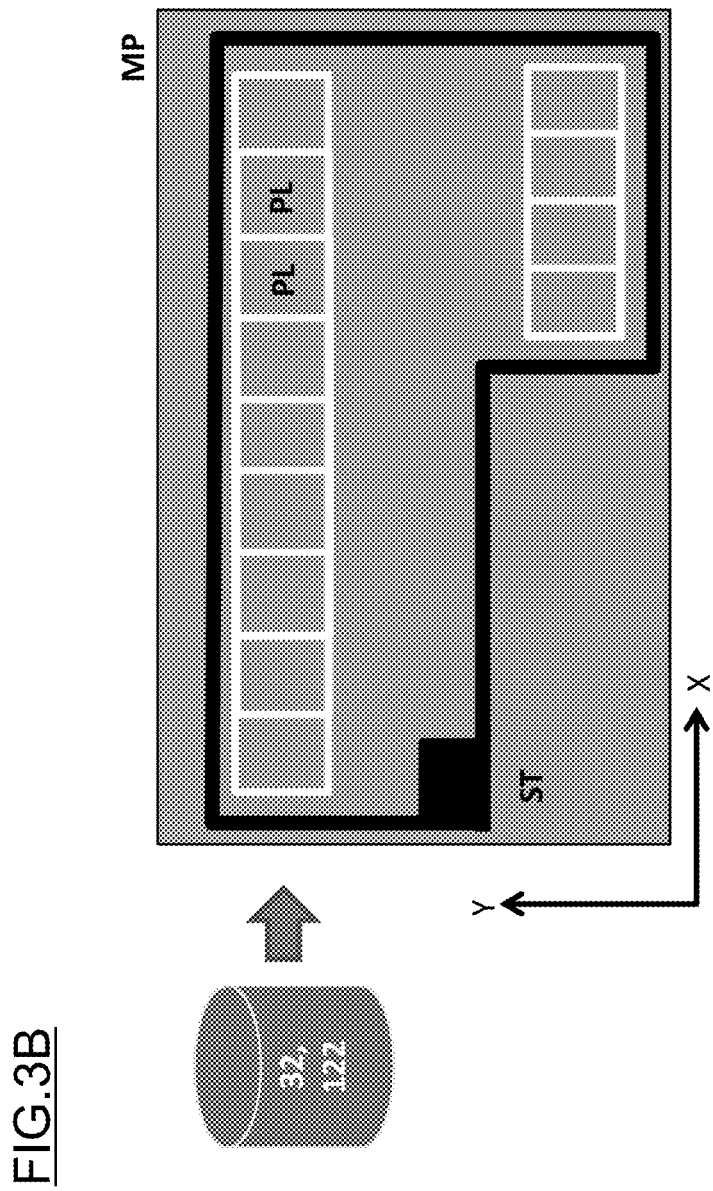
FIG. 3B is a diagram for describing a second detection scheme for an obstacle.

As illustrated in FIG. 3B, obstacles including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by parking facilities.

The calculation process for the first area and/or the second area will then be described. The control device 10 calculates, as the first area, an area in which the visual field is shaded by an obstacle when the operator M observes from the observation position. The first area which is unobservable or visually unrecognizable from the operator M can be calculated from (based on) the positional relationship with the obstacle. A blind area caused not only by an obstacle but by the vehicle V as the target of operation may also be set as the first area which is visually unrecognizable. The control device 10 calculates, as the first area, an area in which the visual field is shaded by the vehicle V as the target of operation when the operator M observes from the observation position. The first area which is unobservable from the operator M can be calculated from (based on) the positional relationship with the vehicle V to be parked. On the basis of the positional relationship between the position of an obstacle and the position of the operator M, the control device 10 calculates the second area observable by the operator M from the calculated position at which the operator M observes the surroundings. The control device 10 calculates, as the second area, an area in which the visual field is not shaded by an obstacle when the operator M observes from the observation position. As will be understood, obstacles include other vehicles that are not the targets of operation. From the viewpoint of reducing the calculation load, the control device 10 may initially calculate the first area and set an area other than the first area as the second area. Additionally or alternatively, the first area may be set as a relatively wide area in consideration of the detection accuracy of an obstacle and the detection accuracy of the position of the operator M.

Figure 4A:
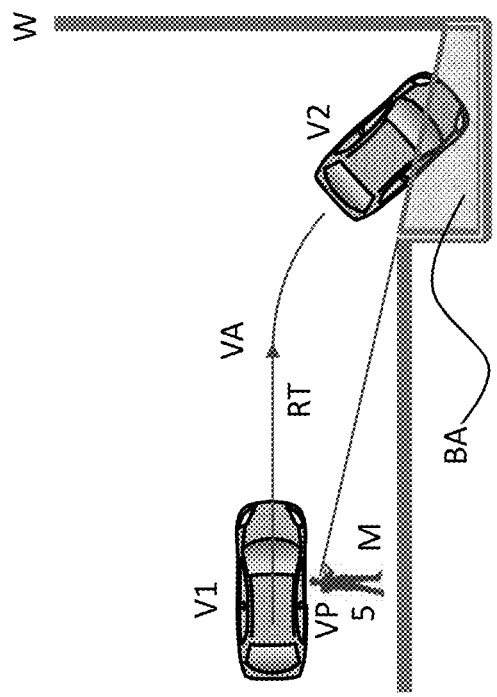
FIG. 4A is a diagram for describing a first calculation scheme for a first area (blind area) and a second area.

FIG. 4A illustrates an example of the case in which a blind area occurs due to the structure of the parking lot. In the example of FIG. 4A, the visual field of the operator M is shaded by a wall W of the parking lot. The control device 10 calculates, as a first area BA, an area that is estimated to be hidden behind the wall W and visually unrecognizable when the operator M observes from an observation position VP. In the example illustrated in FIG. 4A, the vehicle V1 moves/travels/drives along a parking route RT and the operator M standing on the side of the vehicle V1 operates the operation terminal 5. The control device 10 calculates, as a second area VA, an area that can be estimated to be visually recognizable without being shaded by another object when the operator M observes from the observation position VP.

Figure 4B:
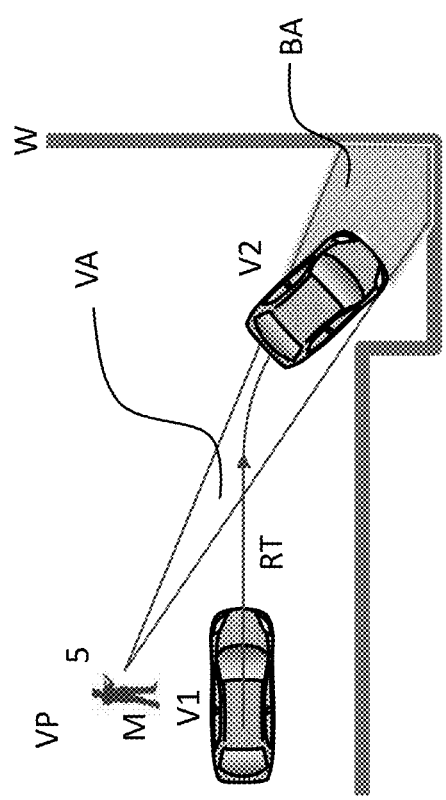
FIG. 4B is a diagram for describing a second calculation scheme for a first area (blind area) and a second area.

FIG. 4B illustrates an example of the case in which a blind area occurs due to the vehicle V itself as the target of control. The control device 10 calculates, as the second area VA, an area that can be estimated to be visually recognizable without being shaded by another object when the operator M observes from the observation position VP. In the example of FIG. 4B, the visual field of the operator M is shaded by the vehicle V2 which is located at a position of turn for parking on the estimated parking route. The control device 10 calculates, as the first area BA, an area that is estimated to be hidden behind the vehicle V2 and visually unrecognizable when the operator M observes from the observation position VP. The control device 10 preliminarily stores the vehicle information, such as the height and size of the vehicle V, which is used in the calculation of the first area BA. The vehicle information may be information unique to the vehicle or may also be information defined in accordance with the vehicle type and the like.

As illustrated in FIG. 4C, on the basis of the intensity of the received radio waves, generation of reflected waves, occurrence of interference and multipath, etc. between a communication device 51 and an antenna 511 of the operation terminal 5 and the communication device 21 and antennas 211 of the communication device 21 of the parking control apparatus 100, the existence of a recessed part may be determined from the position of the wall of the parking lot or the shape of the space, and the presence of a blind area may be determined on the basis of the determination result.

The control procedure of parking control will be described below with reference to the flowchart illustrated in FIG. 5.

FIG. 5 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an autonomous manner to a parking space on the basis of the operation command acquired from outside of the vehicle.

In step 101, the control device 10 of the parking control apparatus 100 acquires information around the vehicle. Acquisition of the ranging signals and acquisition of the captured images may be selectively executed. The control device 10 acquires the ranging signals, as necessary, from the ranging devices 2 which are attached to multiple sites of the vehicle V. The control device 10 acquires the images, as necessary, which are captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects parking available spaces from among the parking spaces. The parking available spaces are parking spaces which are empty (i.e., other vehicles are not parked) and to which routes for completing the parking can be calculated.

In one or more embodiments of the present invention, the condition that a parking route can be calculated means that a trajectory of the route from the current position to a target parking position can be rendered on the road surface coordinates without interfering with obstacles (including parked vehicles).

In step 103, the control device 10 transmits the parking available spaces to the operation terminal 5, controls the display 53 to display the parking available spaces, and requests the operator M to input selection information of the target parking position for parking the vehicle V. The target parking position may be automatically selected by the control device 10 or the parking facility side. When the operation command of specifying a parking space is input to the operation terminal 5, the parking space is set as the target parking position.

Figure 6:
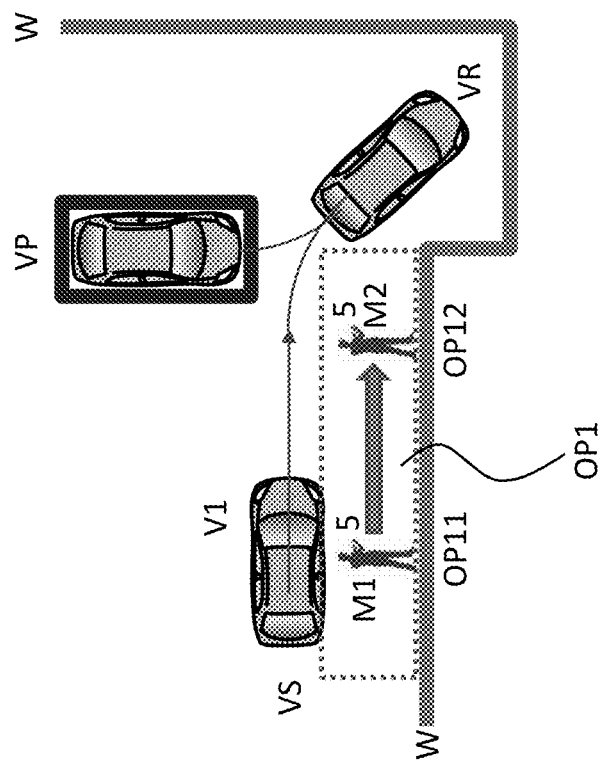
FIG. 6 is a diagram for describing a search scheme for first positions at which deboarding is possible.

In step 104, the control device 10 searches for one or more first positions. The first positions are the positions of places at which the operator M in the vehicle interior can get off the vehicle. The first positions refer to places that are wide enough for an occupant to open the door and get off the vehicle. The shape and size of an area required for an occupant to open the door and get off the vehicle can be preliminarily calculated and stored. In the route to the target parking position, places at which the vehicle V can travel and an occupant can get off the vehicle are searched for. FIG. 6 illustrates a detected first position. As illustrated in FIG. 6, a first position OP1 may be detected as an area or may also be detected as a point. The area detected as the first position OP1 includes two or more first positions OP1 that are specified by points.

In step 105, the control device 10 extracts candidates for a second position OP2 from the one or more first positions OP1. In the example illustrated in FIG. 6, two or more first positions OP1 are set in the first position OP1 which is searched for as an area. FIG. 6 illustrates parking control in which the vehicle V moves/travels/drives from a parking control start point VS to a point of turn for parking VR and changes the shift position to reverse at the position of turn for parking VR to move to a target parking position VP. The two or more first positions OP1 may be set at predetermined intervals or may also be set as coordinates that satisfy a predetermined function. In the example illustrated in FIG. 6, two or more candidates for the second position OP2 are set in the first position OP1 as an area. Specifically, among points included in the first position OP1 detected in the vicinity of the parking control process start point of the vehicle V, a first position OP11 and a first position OP12 to which the operator M can move are extracted as the candidates for the second position OP2. The number of candidates for the second position OP2 is not limited, and other one or more first positions may be provided between the first position OP11 and the first position OP12. The above-described points to which the operator M can move and points along the parking route can be extracted as the candidates for the second position OP2.

For each of the set candidates for the second position OP2, the operability of remote operation is evaluated, and one second position OP2 is selected on the basis of the evaluation result. In one or more embodiments of the present invention, among the one or more first positions OP1 (candidates for the second position OP2) at which the operator M of the vehicle V can get off the vehicle, one second position OP2 with relatively high operability of remote operation is selected. The operability of remote operation is determined on the basis of ease of checking the surroundings of the vehicle. In one or more embodiments of the present invention, the ease of checking the surroundings of the vehicle is determined on the basis of the existence of an observable area and the area thereof when the operator M observes from the second position. The observable area is determined on the basis of the target parking position or/and the position of an obstacle around the parking route. The observable area can also be defined from the viewpoint that it is not an unobservable area (not a blind area). That is, the observable area may be determined on the basis of a criterion that it does not belong to an unobservable area (blind area).

In step 106, the control device 10 detects the position at which an obstacle exists using the previously described scheme.

In step 107, the control device 10 calculates the first area unobservable by the operator M from the observation position VP. The first area is calculated on the basis of the position of an obstacle. The control device 10 calculates the second area observable by the operator M from the observation position VP. The second area is calculated on the basis of the position of an obstacle. The position of an obstacle refers to the position of an area in which the obstacle exists. That is, the position of an obstacle is represented by the coordinate values of an occupied area by the obstacle in the three-dimensional coordinates.

In step 108, the control device 10 selects the second position OP2 with relatively high operability of remote operation from among the one or more first positions OP1 at which the operator M of the vehicle V can get off the vehicle.

FIG. 7 illustrates a subroutine of step 108.

In step 120 of FIG. 7, a determination is made as to whether or not one or more first positions have been able to be detected. In general, it is preferred that the second position as the deboarding position be close to the target parking position, and the detection area for the first positions is therefore set to a predetermined distance range from the target parking position. When no first positions can be detected in the detection area, the process proceeds to step 123, in which the detection area is extended to detect first positions. When a first position detected by extending the detection area is the second position, that is, the deboarding position, the deboarding position and the target parking position may be separated from each other. In such a case, therefore, an operation position close to the target parking position is set differently. When an operation position different than the deboarding position is set, positional information of the set second position (deboarding position) is presented to the operator M. In addition, it is preferred to present the operator M with the route from the second position (deboarding position) to the operation position together with the positional information of the second position.

In step 121, the control device 10 selects the second position with relatively high operability when performing the remote operation in an area near the second position (the vicinity of deboarding position). An evaluation index for determining the operability of remote operation is that the operator M can easily confirm the situation around the vehicle as the target of operation, the state of the vehicle V moving along the parking route and the situation around the vehicle V, the state of the target parking position and the situation around the target parking position, and the state of the position of turn for parking of the vehicle V and the situation around the position of turn for parking.

The operator M who performs the remote operation pays attention to the surroundings of the vehicle V as the target of operation in order to confirm the safety of the operation. If the surroundings of the vehicle V as the target of operation cannot be visually recognized, the operability of remote operation is evaluated to be low because it will be difficult to perform the remote operation, such as operating the vehicle to make a stop for an obstacle approaching or operating the vehicle to come close to the obstacle when the vehicle moves along the parking route. The cause of this deterioration in the operability is due to an environment, such as the positional relationship between the operator M, the vehicle V, and the obstacle, but also affects the ease of use and reliability of the parking assistance apparatus of remote operation.

The control device 10 according to one or more embodiments of the present invention preliminarily evaluates the operability of remote operation which varies depending on the position of the operator M and the surrounding environment, and controls the vehicle to make a stop at the second position with relatively high operability. The control device 10 specifies the stop of the vehicle V and may also specify the deboarding position for the operator M by opening a door of the vehicle V as necessary. The second position, which is the deboarding position, is a position with high remote operability. The control device 10 selects the second position at which the operability is constantly good if the operator M performs the remote operation after getting off the vehicle, and can thereby execute the parking control constantly with good operability without being affected by the environment around the target parking position.

The parking control apparatus 100 according to one or more embodiments of the present invention may evaluate the operability of remote operation on the basis of the positions and areas of the unobservable first area (blind area) and observable second area when observed from the deboarding position (second position OP2) for the operator M. In one or more embodiments of the present invention, to evaluate the operability of remote operation objectively or quantitatively, attention is focused on (A) the area of the first area (blind spot), (B) the ratio of the length of the parking route belonging to the first area, (C) the ratio of the vehicle area belonging to the second area at the position of turn for parking, (D) the ratio of the vehicle area belonging to the second area at the target parking position, and/or (E) the ratio of an obstacle belonging to the second area, as evaluation values. The second position is selected on the basis of one or more of these evaluation values. The second position is a reference position for determining the first area and the second area. By changing the second position, the positions and areas of the first area and second area can be changed.

The second position may be selected using one evaluation value of the above evaluation values or may also be selected using two or more evaluation values. When using two or more evaluation values, the result based on each evaluation value may be weighted for the operability, and a first position at which the operability is comprehensively determined to be high may be selected as the second position.

The five selection schemes in one or more embodiments of the present invention will be described below.

The first scheme includes selecting, from among the first positions, a position at which the vehicle moving along the parking route is observable from the operator, as the second position. Specifically, a first position at which the area of a first area (blind area) observed from the operator is relatively small is selected as the second position. The control device 10 calculates a first area that is calculated on the basis of the positional relationship between each first position and the detected obstacle and that is unobservable from the operator M at the first position. The first position at which the area of the first area is relatively small is selected as the second position, and the position at which the vehicle moving along the parking route is observable from the operator is thereby selected as the second position.

Figure 8A:
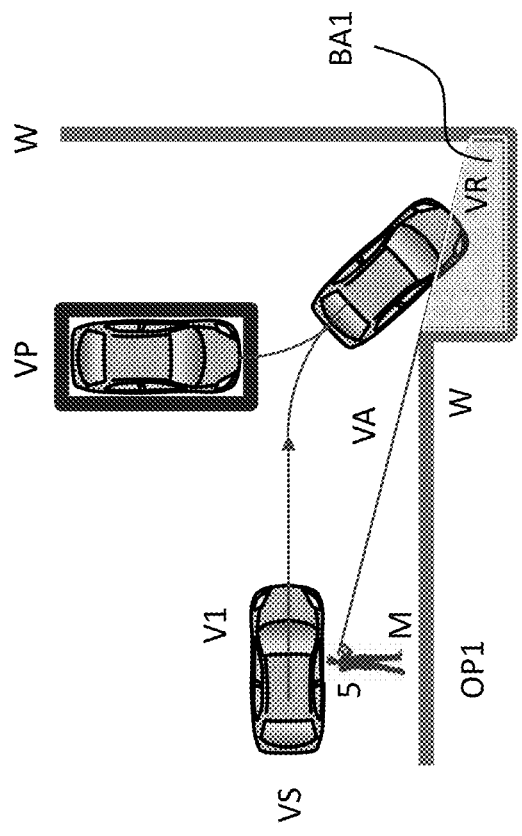
FIG. 8A is a first diagram for describing a first example of a selection scheme for a deboarding position.
Figure 8B:
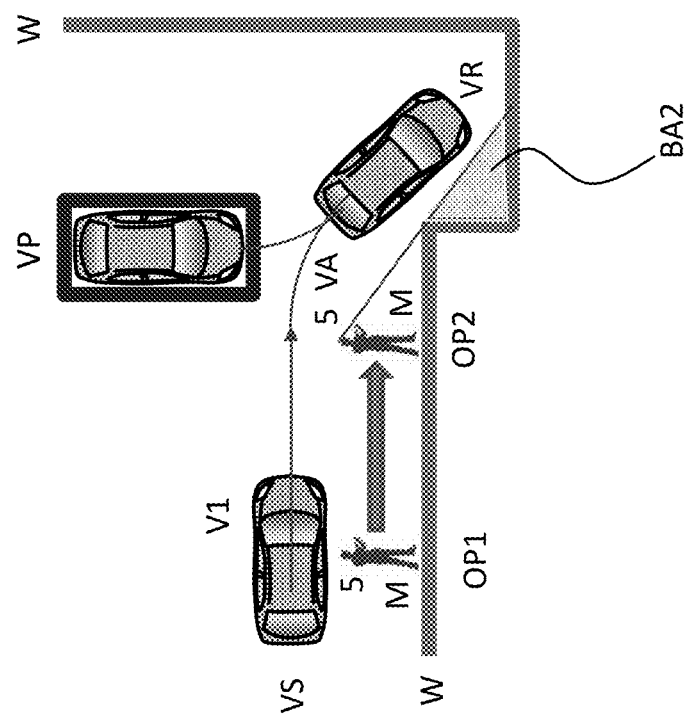
FIG. 8B is a second diagram for describing the first example of the selection scheme for a position at which deboarding is possible.

FIG. 8A and FIG. 8B each illustrate an example in which the area of a first area changes depending on the position of the operator M. In the figures, the position of the vehicle V1 which moves by the parking control is illustrated. The vehicle V1 moves from a parking control start point VS to a point of turn for parking VR and changes gears at the position of turn for parking VR to move further to a target parking position VP. When the operator M observes the movement of the vehicle V1 from the first position OP1 illustrated in FIG. 8A, a first area (blind area) BA1 that is unobservable due to a wall W is formed. FIG. 8B illustrates a first area BA2 when the operator M observes the movement of the vehicle V1 from a first position OP2 different from the first position OP1. The area of the first area BA2 for the operator M at the first position OP2 is smaller than the area of the first area BA1 for the operator M at the first position OP1. That is, the first position OP1 is moved to the first position OP2, and the area of the unobservable first area BA can thereby be reduced. In this example, the two positions of the first positions OP1 and OP2 are compared with each other, but the areas of first areas BA may be compared for three or more first positions OP3 to OPn to select a first position OPn having the smallest area as the second position OP2. In the example illustrated in FIG. 8A, the right front portion of the vehicle V1 belongs to the first area BA1 and cannot be observed from the operator M, but in the example illustrated in FIG. 8B, the vehicle V1 does not belong to the first area BA2 and the operator M can observe the vehicle V1. The operability for the operator M is higher when the area of the blind area, which is hidden behind an obstacle and cannot be seen, is small rather than large.

Figure 9:
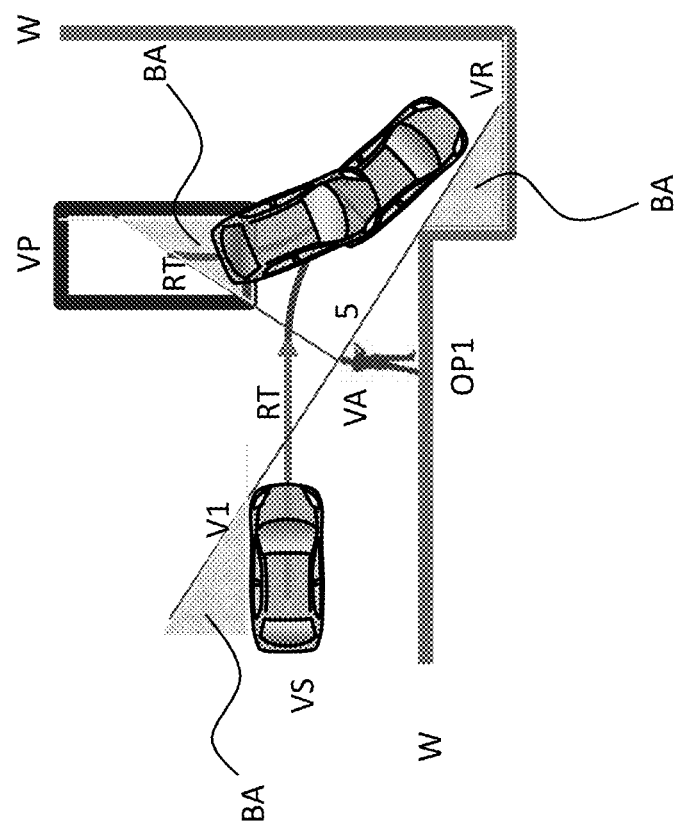
FIG. 9 is a diagram for describing a second example of a selection scheme for a deboarding position.

In the previously referenced FIG. 8A and FIG. 8B, the area of the first area BA at the position of turn for parking VR is compared, but as illustrated in FIG. 9, comparison may be performed for the total area of first areas BA1 that occur at a parking control start position VS, a position of turn for parking VR, and a target parking position VP. Of course, comparison may also be performed for the integral value of a first area (blind area) that occurs from the start point to completion point of the parking control when observed from the first position. In the example of FIG. 9, the case in which the position of the operator M is the first position OP1 is illustrated, but the first position OP1 may be changed as appropriate to compare the total area of first areas BA1 that occur at the parking control start position VS, the position of turn for parking VR, and the target parking position VP. By comparing the operability for the operator M on the basis of the total area of first areas BA1 that occur at the parking control start position VS, the position of turn for parking VR, and the target parking position VP, the ease of observation and the operability for the operator M can be appropriately evaluated at each point of the parking control start position VS, the position of turn for parking VR, and the target parking position VP to which attention should be paid in the parking route. Additionally or alternatively, the ease of observation of the vehicle V1 subjected to the parking control can be evaluated on the basis the distance between the first position OP1 and each point (the parking control start position VS, the position of turn for parking VR, the target parking position VP). The view angle becomes wider as the distance between the first position OP1 and each point is shorter (as the first position OP1 and each point come closer to each other), and therefore the unobservable first area BA is naturally reduced. Thus, a determination can be made that the operability of remote operation is relatively higher as the distance between the first position OP1 and each point is shorter (as the first position OP1 and each point come closer to each other).

By selecting a first position at which the area of each first area is relatively small as the second position, it is possible to improve the operability for the operator M who remotely controls the vehicle V1.

To ensure the ease of minimum confirmation, a first position at which the area of the first area is less than a predetermined value may also be selected as the second position. Additionally or alternatively, a first position at which the area of each first area is smallest may be selected as the second position, or a first position at which the area of each second area is largest may also be selected as the second position.

(2) The second scheme includes selecting, from among the first positions, a position at which the parking route is observable from the operator, as the second position. Specifically, a first position at which the ratio of the length of a parking route belonging to the first area (blind area) observed from the operator is relatively low is selected as the second position, and a position at which the parking route is observable from the operator is thereby selected as the second position. The "ratio of the length of a parking route belonging to the first area (blind area)" refers to the ratio of a length RTB of the parking route belonging to the first area to a total length RTL of the parking route (RTB/RTL). The operator M who performs the remote operation observes the vehicle V1 moving along the parking route, and it is therefore not preferred that the parking route belongs to the unobservable first area BA. To select a first position OP1 at which the operability of remote operation is relatively high, the ratio of the route length belonging to the first area BA out of the total length of the parking route is calculated, and a first position at which the ratio is relatively low is determined as the position at which the operability is relatively high. On the basis of the same point of view, the ratio of the route length belonging to the observable second area VA out of the total length of the parking route may be calculated, and a first position at which the ratio is relatively high may be determined as the position at which the operability is relatively high.

By selecting, from among the first positions, a position at which the parking route is observable from the operator as the second position, it is possible to improve the operability for the operator M who remotely controls the vehicle V1 as compared with a position at which the parking route is unobservable from the operator M. Additionally or alternatively, by selecting a first position at which the ratio of the route length belonging to the first area out of the length of the parking route is relatively low as the second position, it is possible to further improve the operability for the operator M who remotely controls the vehicle V1. To ensure the ease of minimum confirmation, a first position at which the ratio of the parking route length belonging to the first area is less than a predetermined ratio may also be selected as the second position. Additionally or alternatively, a first position at which the ratio of the parking route length belonging to the first area (blind area) is lowest or the ratio of the parking route length belonging to the second area is highest may be selected as the second position. The view angle becomes wider as the distance between the first position OP1 and the parking route is shorter (as the first position OP1 and the parking route come closer to each other), and the unobservable first area BA is therefore reduced. Thus, a determination can be made that the operability of remote operation is relatively higher as the distance between the first position OP1 and the parking route is shorter (as the first position OP1 and the parking route come closer to each other).

(3) The third scheme includes selecting, from among the first positions, a position at which the position of turn for parking along the parking route is observable from the operator, as the second position. Specifically, a first position at which the ratio of the vehicle V belonging to the second area (observable area) at the position of turn for parking VR when observed by the operator is relatively high is selected as the second position, and a position at which the position of turn for parking along the parking route is observable by the operator is thereby selected as the second position. The "ratio of the vehicle V belonging to the second area (observable area) at the position of turn for parking VR" refers to the ratio of a partial area VRP of the vehicle V belonging to the second area to an entire area VRA occupied by the vehicle V at the position of turn for parking VR (VRP/VRA). The ease of observation at the position of turn for parking VR to which attention should be paid in the parking route affects the operability for the operator M.

Figure 10:
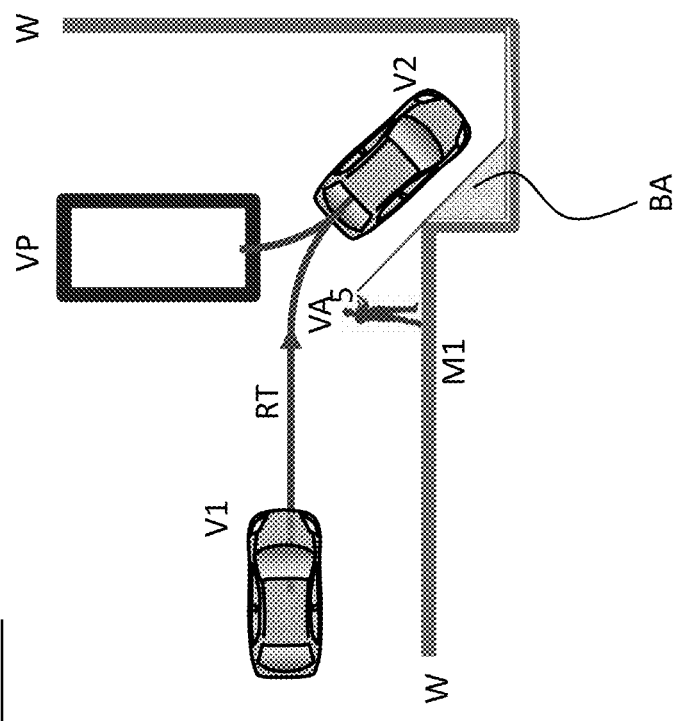
FIG. 10 is a diagram for describing a third example of a selection scheme for a deboarding position.

As illustrated in FIG. 10, when the ratio of an existence area (occupied area) of the vehicle V1 belonging to the observable second area VA at the position of turn for parking VR is high, the operability of remote operation is determined to be relatively higher than when the ratio is low. From the same point of view, a first position at which the ratio of the existence area of the vehicle V1 belonging to the first area (blind area) at the position of turn for parking VR is relatively low may also be selected as the second position. By selecting a first position at which the ratio of the vehicle V belonging to the second area (observable area) at the position of turn for parking VR is relatively high as the second position, the vehicle V at the position of turn for parking VR can be easily confirmed, and it is possible to improve the operability for the operator M who remotely controls the vehicle V1. To ensure the ease of minimum confirmation, a first position at which the ratio of the vehicle V belonging to the second area (observable area) at the position of turn for parking VR is not less than a predetermined ratio may also be selected as the second position. Additionally or alternatively, a first position at which the ratio of the area of the vehicle V at the position of turn for parking VR belonging to the second area VA is highest or the ratio of the area of the vehicle V at the position of turn for parking VR belonging to the first area BA is relatively low may be selected as the second position. The view angle becomes wider as the distance between the first position OP1 and the position of turn for parking VR is shorter (as the first position OP1 and the position of turn for parking VR come closer to each other), and the unobservable first area BA is therefore reduced. Thus, a determination can be made that the operability of remote operation is relatively higher as the distance between the first position OP1 and the position of turn for parking VR is shorter (as the first position OP1 and the position of turn for parking VR come closer to each other).

(4) The fourth scheme includes selecting, from among the first positions, a position at which the target parking position is observable by the operator, as the second position. Specifically, a first position at which the ratio of the vehicle V belonging to the second area (observable area) at the target parking position VP is relatively high is selected as the second position, and a position at which the target parking position is observable from the operator is thereby selected as the second position. The "ratio of the vehicle V belonging to the second area (observable area) at the target parking position VP" refers to the ratio of a partial area VPP of the vehicle V belonging to the second area to an entire area VPA occupied by the vehicle V at the target parking position VP (VPP/VPA).

The ease of observation at the target parking position VP to which attention should be paid in the parking route affects the operability for the operator M.

Figure 11:
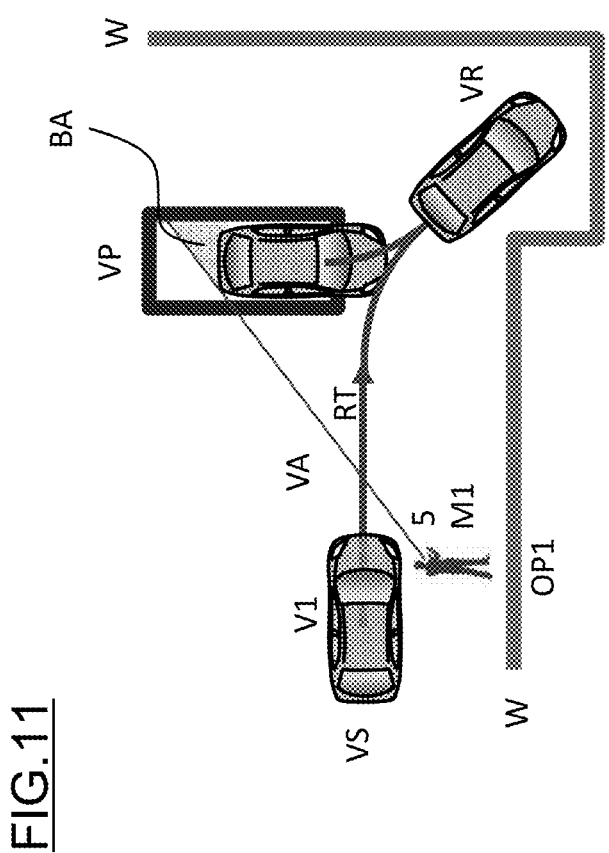
FIG. 11 is a diagram for describing a fourth example of a selection scheme for a deboarding position.

As illustrated in FIG. 11, when the ratio of the target parking position VP belonging to the observable second area VA is high, that is, when the ratio of an existence area of the vehicle V1 belonging to the observable second area VA upon movement to the target parking position VP is high, the operability of remote operation is determined to be relatively higher than when the ratio is low. From the same point of view, a first position at which the ratio of the area of the target parking position VP (area) belonging to the first area (blind area) is relatively low may also be selected as the second position. By selecting a first position at which the ratio of the existence area of the vehicle V belonging to the second area (observable area) at the target parking position VP is relatively high as the second position, the vehicle V1 at the target parking position VP can be easily confirmed, and it is possible to improve the operability for the operator M who performs the remote control. To ensure the ease of minimum confirmation, a first position at which the ratio of the vehicle V belonging to the second area (observable area) at the target parking position VP is not less than a predetermined ratio may also be selected as the second position. Additionally or alternatively, a first position at which the ratio of the area of the target parking position VP (area) belonging to the first area BA is lowest or the ratio of the area of the target parking position VP (area) belonging to the second area VA is highest may be selected as the second position. The view angle becomes wider as the distance between the first position OP1 and the target parking position VP is shorter (as the first position OP1 and the target parking position VP come closer to each other), and the unobservable first area BA is therefore reduced. Thus, a determination can be made that the operability of remote operation is relatively higher as the distance between the first position OP1 and the target parking position VP is shorter (as the first position OP1 and the target parking position VP come closer to each other).

(5) The fifth scheme includes selecting, from among the first positions, a position at which an obstacle is observable by the operator, as the second position. Specifically, a first position at which the ratio of an obstacle belonging to the second area (observable area) when observed by the operator is relatively high is selected as the second position, and a position at which the obstacle is observable from the operator is thereby selected as the second position from among the first positions. The "ratio of an obstacle belonging to the second area (observable area)" refers to the ratio of a partial area OBP of the obstacle belonging to the second area to an entire area OBA occupied by the obstacle (OBP/OBA).

The ease of observing the existence of an obstacle to which attention should be constantly paid during the parking control affects the operability for the operator M.

Figure 12:
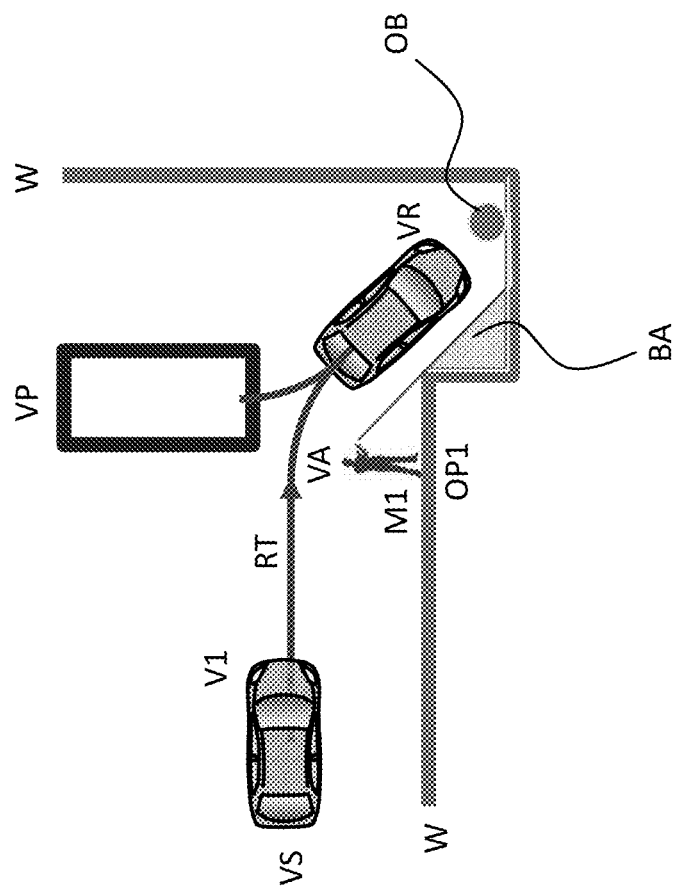
FIG. 12 is a diagram for describing a fifth example of a selection scheme for a deboarding position.

As illustrated in FIG. 12, when the ratio of an existence area of an obstacle OB belonging to the observable second area VA is high, the operability of remote operation is determined to be relatively higher than when the ratio is low. From the same point of view, a first position at which the ratio of the area of the obstacle OB (area) belonging to the first area (blind area) is relatively low may also be selected as the second position. By selecting a first position at which the ratio of the existence area of the obstacle OB belonging to the second area (observable area) is high as the second position, it is possible to improve the operability for the operator M who remotely controls the vehicle V1. To ensure the ease of minimum confirmation, a first position at which the ratio of an obstacle belonging to the second area (observable area) is not less than a predetermined ratio may also be selected as the second position. Additionally or alternatively, a first position at which the ratio of the area of the obstacle OB (area) belonging to the first area BA is lowest or the ratio of the area of the obstacle OB (area) belonging to the second area VA is highest may be selected as the second position. The view angle becomes wider as the distance between the first position OP1 and an obstacle is shorter (as the first position OP1 and the obstacle come closer to each other), and the unobservable first area BA is therefore reduced. Thus, a determination can be made that the operability of remote operation is relatively higher as the distance between the first position OP1 and an obstacle is shorter (as the first position OP1 and the obstacle come closer to each other).

In step 122 of FIG. 7, a first position having a relatively high operability evaluation value of the remote operation obtained by the above scheme or schemes is selected as the second position. The operability of remote operation may be evaluated using one of the above schemes or may also be evaluated by combining two or more of the schemes.

Referring again to FIG. 5, the processes of step 109 and subsequent steps are performed. In step 109, the control device 10 calculates the parking route, which includes the second position as the deboarding position, to the target parking position. The parking route includes a position of turn for parking necessary for moving to the parking space. For this operation, the parking route is defined as a line and is also defined as a strip-shaped area corresponding to the occupied area by the vehicle V based on the vehicle width. The occupied area by the vehicle V to be parked is defined with consideration for the vehicle width and a margin width ensured for movement to park.

In step 109, the control device 10 generates a control instruction for moving the vehicle V along the calculated parking route. The control device 10 preliminarily stores the spec information of the vehicle V necessary for the control instruction. Examples of the control instruction include instructions for the steering amount, steering speed, steering acceleration, shift position, speed (including zero), acceleration, and deceleration of the vehicle V, which are associated with the timing or position when the vehicle V travels along the parking route, and other operation instructions. The control instruction includes the execution timing or execution position of the above operation instruction for the vehicle V. The instruction regarding the parking route and the operation instruction associated with the parking route are executed by the vehicle V, and the vehicle can thereby be moved (parked) to the target parking position.

The control instruction according to one or more embodiments of the present invention includes a stop instruction for the vehicle V at the second position. Additionally or alternatively, the control instruction may include an operation of opening a door of the vehicle V at the second position.

In step 110, the control device 10 presents the operator M with the second position, which is the deboarding place, and the calculated parking route.

In step 111, the operator M confirms the parking route, and when the execution instruction is input, the process proceeds to step 112, in which execution of the parking control is started. When the parking control is started in step 112, then, in step 113, the vehicle V is stopped at the second position. The operator M gets off the vehicle at the second position, and the remote operation is started at this position.

In steps 112 and 113, the operator M may be confused if information is not given about a series of operations, such as the autonomous driving to the second position and the deboarding.

Figure 13A:
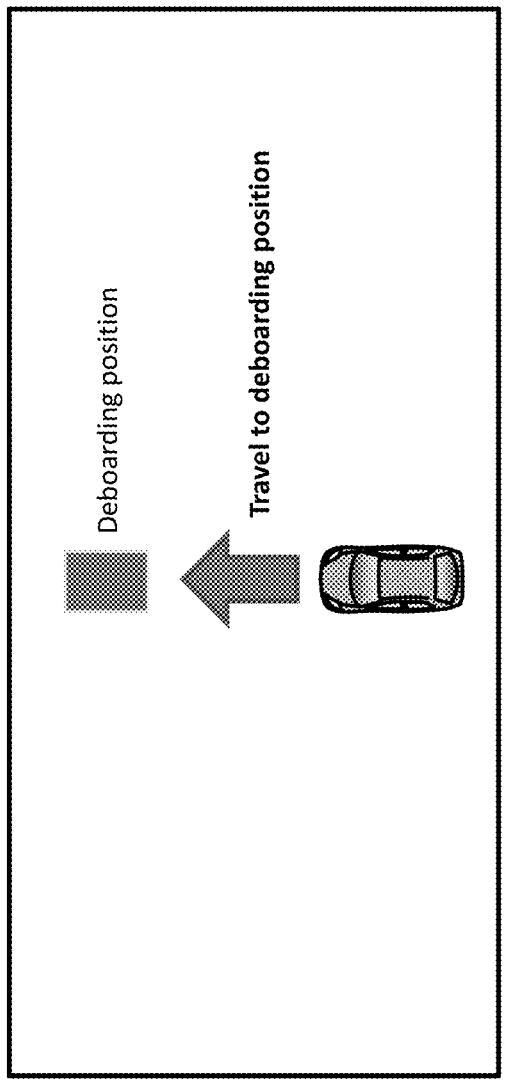
FIG. 13A is a diagram illustrating a presentation example of first guidance information of a deboarding position.
Figure 13B:
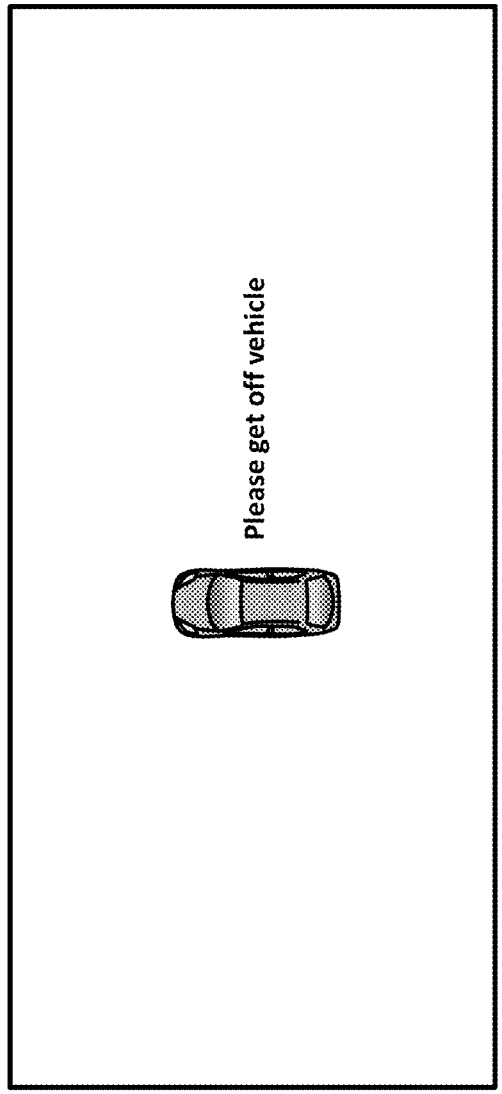
FIG. 13B is a diagram illustrating a presentation example of second guidance information of a deboarding position.

For this reason, the control device 10 presents, on the display 301 of the vehicle V, guidance information to the selected second position. As an example, as illustrated in FIG. 13A, the deboarding position is presented and the plan that the vehicle V travels to the deboarding position is transmitted to the operator M. The operator M is preliminarily informed that the vehicle V moves to the deboarding position, and the operator M can therefore be relieved. Then, as illustrated in FIG. 13B, when the vehicle V arrives at the deboarding position, the control device 10 prompts the operator M to get off the vehicle. The operator M can get off the vehicle at the second position at which the operability of remote operation is high as selected by the control device 10.

Figure 14A:
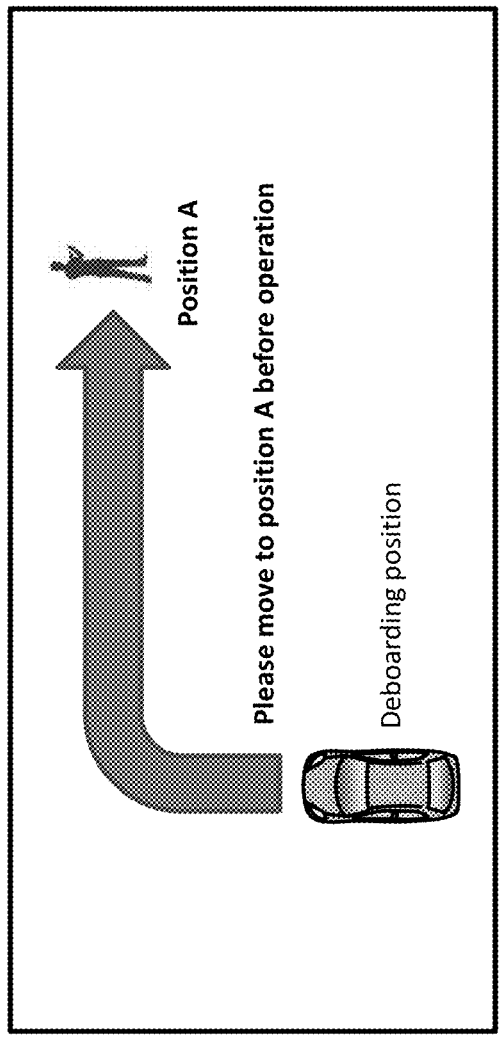
FIG. 14A is a diagram illustrating a presentation example of third guidance information of a deboarding position.

Additionally or alternatively, depending on the structure of a parking lot, the operator M may be guided to a position different than the second position. The operation position may be set in a parking lot. The control device 10 presents, on the onboard display 301, the second position as the deboarding position and the guidance information to a position A that is different than the second position. As an example, as illustrated in FIG. 14A, the deboarding position (second position) is presented, and the guidance information to the position A different than the second position is transmitted to the operator M. The operator M is instructed to move to the position A (second position) after getting off the vehicle and to perform the remote operation after the movement. Specifically, text information "Please move to position A before operation" is presented to guide the operator M to the position A.

Figure 14B:
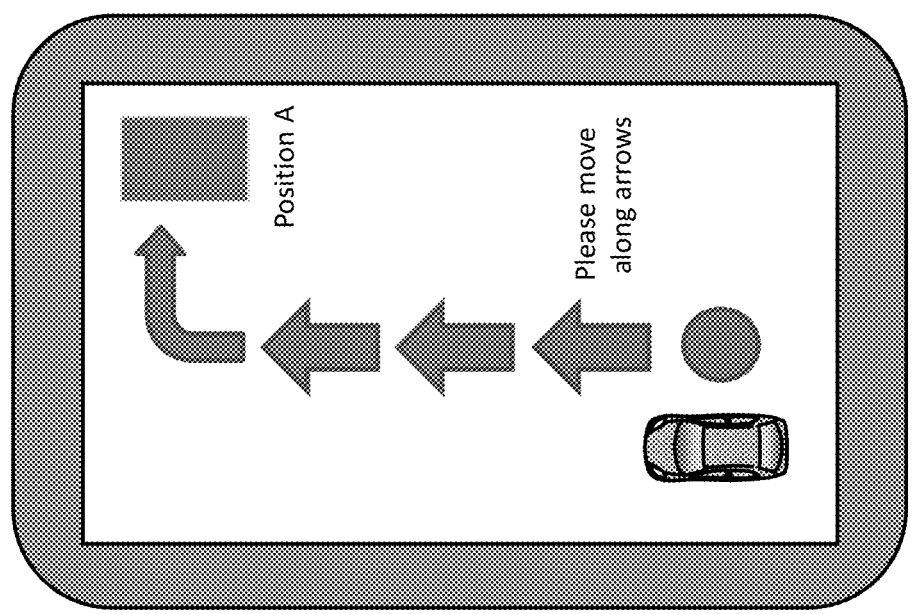
FIG. 14B is a diagram illustrating a presentation example of fourth guidance information of a deboarding position.

The control device 10 controls the vehicle V to move to a place at which the vehicle can make a stop, and then guides the operator M to walk to the position A. This guidance information allows the operator M to understand that the operator M is to move to the position A after getting off the vehicle, but the operator M cannot see the onboard display 301 after getting off the vehicle and may not know how to move to the position A. In preparation for such a situation, the control device 10 controls the display 53 of the operation terminal 5, carried by the operator M, to present the guidance information to the position A different than the second position. As an example, as illustrated in FIG. 14B, when the vehicle V arrives at the deboarding position, the control device 10 prompts the operator M to get off the vehicle and presents a route of movement after getting off the vehicle. This allows the operator M to move to the position A in accordance with the presented information on the display 53 of the operation terminal 5.

The information presented on the onboard display 301 allows the operator M to be preliminarily informed that the vehicle V is to move to the deboarding position, and the operator M can therefore be relieved. The operator M can be preliminarily informed that the vehicle V is to move to a position that is different than the second position as the deboarding position, and the operator M can therefore be relieved. After getting off the vehicle, the operator M is presented with information on guidance to the designated position, which is displayed on the display 53 of the operation terminal 5 carried by the operator M, and the operator M can reach the designated position without getting lost. The vehicle can autonomously reach the second position in accordance with the control instruction and the guidance information is then presented; therefore, the operator M can use the parking control apparatus 100 in relief.

In step 114, the remote operation is started by the operator M who has got off the vehicle. The parking control apparatus 100 according to one or more embodiments of the present invention operates to execute the parking control process by remote control for performing the parking through transmitting a target parking position setting command, a parking control process start command, an interruption/cancellation command, and other appropriate commands from the external to the vehicle V without requiring the operator to get on the vehicle V. The operator M has got off the vehicle at the second position at which the operability of remote operation is relatively high, and can therefore perform the remote operation without moving from the second position. Moreover, the operability of remote control is high at the second position, so the operator can execute the parking control operation while observing the surroundings.

In step 115, the control device 10 periodically calculates the first area (and/or second area). The first area unobservable from the observation position and the second area observable from the observation position change as the position of an obstacle and the position of the vehicle V vary. To respond to the change in the situation, the control device 10 calculates the first area (or second area) at a predetermined cycle. In step 116, the control device 10 determines whether or not there is a change in the first area or the second area. When there is a change, the positional relationship between the position of the parking route (including the position of turn for parking) and the first area also changes, and the parking route is therefore calculated again. When a new appropriate parking route can be calculated, the new parking route is employed. The control device 10 calculates the control instruction for the new parking route. In step 117, the control device 10 updates the parking route and the control instruction, which are calculated in step 109, to the new parking route and the new control instruction corresponding to the first area and the second area which have changed over time. In step 116, when there is no change in the first area or the second area, it is not necessary to calculate a new parking route and a new control instruction, so the process proceeds to step 118.

In step 118, the control device 10 monitors the change in the first area and the second area until the vehicle V reaches the position of turn for parking. When the vehicle V reaches the position of turn for parking, the gear shift included in the control instruction is executed in step 119. Step 119 is followed by step 120, in which the parking control is completed by sequentially executing control instructions.

The parking control apparatus 100 according to one or more embodiments of the present invention operates to control the operation of the drive system 40 via the vehicle controller 70 in accordance with the control instruction so that the vehicle V moves along the parking route. The parking control apparatus 100 operates to calculate command signals to the drive system 40 of the vehicle V, such as an EPS motor, while feeding back the output value of the steering angle sensor 50 of the steering apparatus so that the travel trajectory of the vehicle V coincides with the calculated parking route, and transmit the command signals to the drive system 40 or to the vehicle controller 70 which controls the drive system 40.

The parking control apparatus 100 according to one or more embodiments of the present invention includes a control unit for parking control. The control unit for parking control acquires shift range information from an AT/CVT control unit, wheel speed information from an ABS control unit, steering angle information from a steering angle control unit, engine speed information from an ECM, and other necessary information. On the basis of these information items, the control unit for parking control calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V, the vehicle speed sensor 60, and other sensors of the vehicle V, via the vehicle controller 70.

The drive system 40 according to one or more embodiments of the present invention drives the vehicle V1 to move (travel) from the current position to the target parking position by driving based on the control command signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V to the target parking position. The control content and operation scheme for parking of the vehicle V are not particularly limited, and any scheme known at the time of filing this application can be appropriately applied.

When the parking control apparatus 100 according to one or more embodiments of the present invention operates to control the vehicle V to move to the target parking position along the route calculated on the basis of the position of the vehicle V and the position of the target parking position, the accelerator and the brake are controlled in an autonomous manner on the basis of the designated control vehicle speed (set vehicle speed), and the operation of the steering apparatus controls the movement of the vehicle V in an autonomous manner in accordance with the vehicle speed.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) The parking control method according to one or more embodiments of the present invention includes stopping the vehicle V at the second position at which the operability of remote control is relatively high, and the operator M who gets off the vehicle V stopped can therefore perform comfortable remote operation there. The operator M need not move from the second position, at which the operator M gets off the vehicle, in order to look for a place at which the operability is high by himself/herself.

(2) The parking control method according to one or more embodiments of the present invention includes process of selecting a first position at which the area of the first area is relatively small as the second position, and it is thereby possible to improve the operability for the operator M who remotely controls the vehicle V.

(3) The parking control method according to one or more embodiments of the present invention includes process of selecting a first position at which the ratio of the route length belonging to the first area out of the length of the parking route is relatively low as the second position, and it is thereby possible to improve the operability for the operator M who remotely controls the vehicle V.

(4) The parking control method according to one or more embodiments of the present invention includes process of selecting a first position at which the ratio of the vehicle V belonging to the second area (observable area) at the position of turn for parking VR is relatively high as the second position, and it is thereby possible to improve the operability for the operator M who remotely controls the vehicle V. In particular, the operator M can easily perceive the situation of the vehicle V and its surroundings at the position of turn for parking VR and can easily perform the operation.

(5) The parking control method according to one or more embodiments of the present invention includes process of selecting a first position at which the ratio of the vehicle V belonging to the second area (observable area) at the target parking position VP is relatively high as the second position, and it is thereby possible to improve the operability for the operator M who remotely controls the vehicle V. In particular, the operator M can easily perceive the situation of the vehicle V and its surroundings at the target parking position VP and can easily perform the operation.

(6) The parking control method according to one or more embodiments of the present invention includes process of selecting a first position at which the ratio of the existence area of an obstacle OB belonging to the second area (observable area) is relatively high as the second position, and it is thereby possible to improve the operability for the operator M who remotely controls the vehicle V1. In particular, the operator M can easily perceive the positional relationship between the obstacle and the vehicle V and can easily perform the operation.

(7) The parking control method according to one or more embodiments of the present invention includes process of presenting, on the display 301 of the vehicle V, guidance information to the selected second position. The operator M can be preliminarily informed that the vehicle V moves to the deboarding position, and the operator M can therefore be relieved. When the vehicle V arrives at the deboarding position, the control device 10 prompts the operator M to get off the vehicle. The operator M can get off the vehicle at the second position at which the operability of remote operation is high as selected by the control device 10.

(8) The parking control method according to one or more embodiments of the present invention includes process of informing that the vehicle is to move to a position that is different than the second position as the deboarding position, and the operator M can therefore be relieved. After getting off the vehicle, the operator M is presented with information on guidance to the designated position, which is displayed on the display 53 of the operation terminal 5 carried by the operator M, and the operator M can reach the designated position without getting lost. The vehicle can autonomously reach the second position in accordance with the control instruction and the guidance information is then presented; therefore, the operator M can use the parking control apparatus 100 in relief.

(9) Also in the parking control apparatus 100 in which the method according to one or more embodiments of the present invention is executed, the actions and effects as described in the above (1) to (8) are exhibited.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information
135 Obstacle information
20 Input device
21 Communication device
211 Antennas
30 Output device
31 Display
1a-1d Cameras
2 Ranging devices
3 Information server
31 Communication device
32 Storage device
33 Map information
34 Parking lot information
35 Obstacle information
5 Operation terminal
51 Communication device
511 Antenna
52 Input device
53 Display
200 Onboard device
40 Drive system
50 Steering angle sensor
60 Vehicle speed sensor
70 Vehicle controller
V, V1 Vehicle
BA First area
VA Second area

The invention claimed is:

1. A parking control method for executing a control instruction to move a vehicle along a parking route, comprising:
   detecting first positions at which an operator of the vehicle can get off the vehicle;
   calculating an operability evaluation value of a remote operation of each of the first positions, the operability evaluation value for each of the first positions based on an observable area from a respective first position;

selecting a second position with a relatively high operability evaluation value of the remote operation of the vehicle executed by the operator from among the first positions;

stopping the vehicle at the second position where the operator gets off the vehicle; and parking the vehicle in accordance with the control instruction on a basis of an operation command acquired from the operator who has got off the vehicle.

2. The parking control method according to claim 1, comprising:

detecting an obstacle; and selecting a position at which the vehicle moving along the parking route is observable from the operator as the second position from among the first positions on a basis of positional relationships between the first positions and a position of the obstacle.

3. The parking control method according to claim 1, comprising:

detecting an obstacle; and selecting a position at which the parking route is observable from the operator as the second position from among the first positions on a basis of positional relationships between the first positions and a position of the obstacle.

4. The parking control method according to claim 1, comprising:

detecting an obstacle; and selecting a position at which a position of turn for parking along the parking route is observable from the operator as the second position from among the first positions on a basis of positional relationships between the first positions and a position of the obstacle.

5. The parking control method according to claim 1, comprising:

detecting an obstacle; and selecting a position at which a target parking position on the parking route is observable from the operator as the second position from among the first positions on a basis of positional relationships between the first positions and a position of the obstacle.

6. The parking control method according to claim 1, comprising:

detecting an obstacle; and selecting a position at which the obstacle which the vehicle moving along the parking route approaches is observable from the operator as the second position from among the first positions on a basis of positional relationships between the first positions and a position of the obstacle.

7. The parking control method according to claim 1, comprising presenting information on guidance to the selected second position on a display of the vehicle.

8. The parking control method according to claim 1, comprising presenting information on guidance to a different position than the selected second position on an operation terminal carried by the operator.

9. A parking control apparatus comprising a control device configured to execute a control instruction for moving a vehicle along a parking route, the control device operating to:

detect first positions at which an operator of the vehicle can get off the vehicle;

calculate an operability evaluation value of a remote operation of each of the first positions, the operability evaluation value for each of the first positions based on an observable area from a respective first position;

select a second position with a relatively high operability evaluation value of the remote operation of the vehicle executed by the operator from among the first positions;

stop the vehicle at the second position where the operator gets off the vehicle; and park the vehicle in accordance with the control instruction on a basis of an operation command acquired from the operator who has got off the vehicle.

* * * * *